(12) United States Patent
Jain et al.

(10) Patent No.: US 9,727,408 B2
(45) Date of Patent: Aug. 8, 2017

(54) MEMORY ERROR DETECTION SYSTEM

(71) Applicant: FREESCALE SEMICONDUCTOR, INC., Austin, TX (US)

(72) Inventors: Aarul Jain, New Delhi (IN); Dirk Wendel, Grasbrunn (DE)

(73) Assignee: NXP USA, INC., Austin, TX (US)

( * ) Notice: Subject to any disclaimer, the term of this patent is extended or adjusted under 35 U.S.C. 154(b) by 121 days.

(21) Appl. No.: 14/975,828

(22) Filed: Dec. 20, 2015

(65) Prior Publication Data

US 2017/0177428 A1    Jun. 22, 2017

(51) Int. Cl.
*G06F 11/00* (2006.01)
*G06F 11/07* (2006.01)
*G06F 11/16* (2006.01)
*G06F 11/08* (2006.01)
*G06F 11/10* (2006.01)

(52) U.S. Cl.
CPC ........ *G06F 11/079* (2013.01); *G06F 11/0727* (2013.01); *G06F 11/0751* (2013.01); *G06F 11/08* (2013.01); *G06F 11/1016* (2013.01); *G06F 11/167* (2013.01)

(58) Field of Classification Search
CPC ..... G06F 11/1016; G06F 11/08; G06F 11/167
See application file for complete search history.

(56) References Cited

U.S. PATENT DOCUMENTS

| | | | |
|---|---|---|---|
| 5,157,782 A * | 10/1992 | Tuttle ................. | G06F 11/3688 714/25 |
| 5,329,535 A | 7/1994 | Coker | |
| 6,757,854 B1 | 6/2004 | Zhao et al. | |
| 6,938,201 B2 | 8/2005 | Goyins et al. | |
| 7,257,750 B1 * | 8/2007 | Singh ..................... | G11C 29/42 714/732 |
| 8,413,018 B2 * | 4/2013 | Ko ...................... | G06F 11/1016 714/768 |
| 8,583,971 B2 | 11/2013 | Janarthanam et al. | |
| 8,612,814 B1 * | 12/2013 | Tan ........................ | G11C 29/44 714/732 |

(Continued)

OTHER PUBLICATIONS

Push, P. Beautlin and Dr. T. Latha, "An Effective Approach for the Detection of Soft Errors in FIFO Buffers Using Parity Registers", International Journal of Scientific & Engineering Research, vol. 5, Issue 5, May 2014, pp. 751-755.

(Continued)

*Primary Examiner* — Charles Ehne
(74) *Attorney, Agent, or Firm* — Charles E. Bergere

(57) ABSTRACT

An error detection system detects errors in data packets stored in a memory. A read signature generation circuit generates a read signature of a first data packet. A write signature generation circuit generates a write signature of a second data packet. When a trigger generation circuit generates a trigger signal, a first latching circuit stores a write address as a latch write address and a second latch stores the write signature as a latch write signature. A first synchronization and comparison circuit generates a comparison signal based on the latched write address and a read address. A second synchronization and comparison circuit generates a fault signal based on the comparison signal, the latched write signature, and the read signature.

20 Claims, 3 Drawing Sheets

(56) References Cited

U.S. PATENT DOCUMENTS

| | | | | |
|---|---|---|---|---|
| 2011/0041030 A1* | 2/2011 | Ko | ...................... | G06F 11/1016 |
| | | | | 714/752 |
| 2011/0041031 A1* | 2/2011 | Ko | ...................... | G06F 11/1016 |
| | | | | 714/752 |
| 2011/0258499 A1* | 10/2011 | Casarsa | ............ | G01R 31/31701 |
| | | | | 714/726 |
| 2012/0166890 A1* | 6/2012 | Janarthanam | ........... | G06F 11/08 |
| | | | | 714/49 |

OTHER PUBLICATIONS

Sideris, Isidoros and Pekmestzi, Kiamal, "A column parity based fault detection mechanism for FIFO buffers", Integration, the VLSI Journal, vol. 46, Issue 3, Jun. 2013, pp. 265-279.

\* cited by examiner

MEMORY ERROR DETECTION SYSTEM

BACKGROUND

The present invention relates generally to memories, and, more particularly, to an error detection system for a memory.

Memories such as dynamic random-access memories (DRAMs), double-data-rate (DDR) memories, and static random-access memories (SRAMs) are used to store information such as instructions and data packets. A processor fetches instructions and data packets from a memory and processes the data packets using the instructions. The processor also stores processed data packets in memory.

The processor and memories, along with multiple other circuits, may be integrated on a single semiconductor chip or integrated circuit (IC). The IC is packaged to prevent physical damage and corrosion thereto. However, the packaging material may contain small amounts of radioactive contaminants that decay and release alpha particles that can disturb the distribution of electrons in the semiconductor material from which the IC is formed. The disturbances can change the logic states of bits stored in the memories. Such an error is referred to as a soft error. Further, cosmic rays, thermal neutrons, random noise, and capacitive and inductive cross-talk can cause errors in the bits stored in the memories.

A known technique to overcome soft errors is to use an error detection system. When a memory receives a data packet, the error detection system calculates an error bit for the data packet and stores the error bit along with the data packet. When the data packet is read from the memory, the error detection system again calculates an error bit corresponding to the read data and compares it with the stored error bit to determine if there is an error in the data packet. However, the calculation logic and space for storing the error bits results in an increase in circuit area.

Implementation of a memory as a first-in first-out (FIFO) aids in reduction of the area required to store the error bits because the processor can access the data packets stored in the FIFO memory sequentially. The processor stores a data packet in the FIFO memory during a write cycle and fetches the data packet from the FIFO memory during a read cycle. The error detection system includes read and write signature generation circuits. The read signature generation circuit calculates a read signature based on data packets read from the FIFO memory, while the write signature generation circuit calculates a write signature based on data packets written to the FIFO memory. When the FIFO memory is empty, i.e., when the read and write addresses are the same and there is no data packet to be read, the read signature is compared with the write signature and if they are not equal, an error signal is generated. However, for the error detection system to compare the write and read signatures, the FIFO memory must be empty. When the FIFO memory is not empty, the FIFO memory halts the write cycles until it is empty, which delays storing new data packets in the FIFO memory.

It would be advantageous to have an error detection system that detects an error in a data packet stored in a FIFO memory irrespective of the FIFO memory being empty, and without interrupting the read and write cycles of the FIFO memory.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
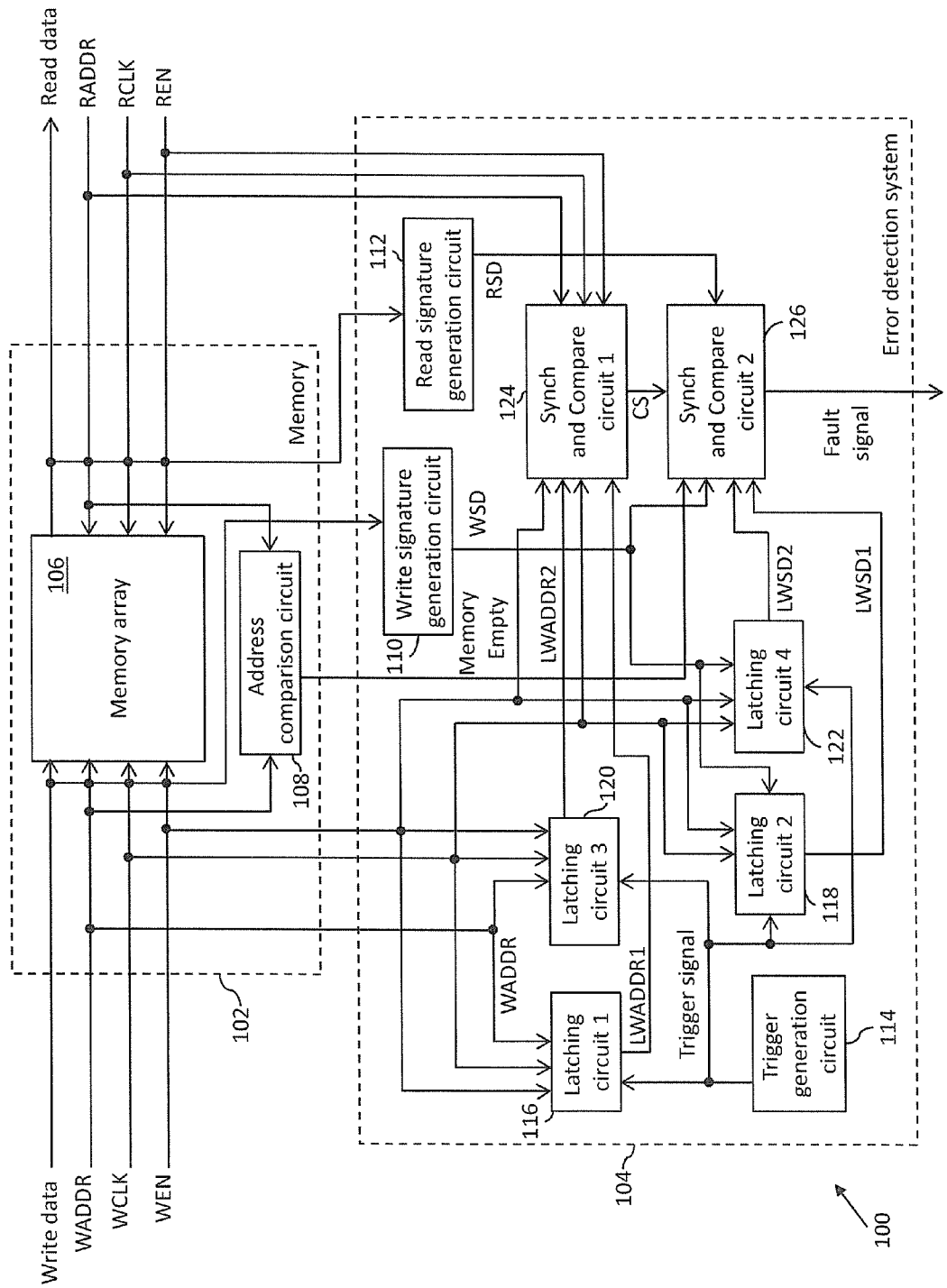
FIG. 1 is a schematic block diagram illustrating an integrated circuit (IC) including an error detection system for detecting errors in data packets stored in a memory in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, an error detection system for detecting errors in data packets stored in a memory is provided. The error detection system is connected to the memory. The error detection system includes a write signature generation circuit, a read signature generation circuit, a trigger generation circuit, first and second latching circuits, and first and second synchronization and comparison circuits. The read signature generation circuit receives a first read address, a read clock signal, a read enable signal, and a first data packet, and generates first read signature based on at least one of the first data packet and read signature of a second data packet. The read signature generation circuit further stores the first read signature. The write signature generation circuit receives a first write address, a write clock signal, a write enable signal, and a third data packet, and generates a first write signature based on at least one of the third data packet and a write signature of a fourth data packet. The write signature generation circuit also stores the first write signature. The first latching circuit receives the first write address, the write enable signal, the write clock signal, and a first trigger signal from the trigger generation circuit, and stores the first write address as a first latch write address when the first trigger signal and the write enable signal are active. The second latching circuit receives the write enable signal, the write clock signal, the first trigger signal, and the first write signature, and stores the first write signature as a first latch write signature when the first trigger signal and the write enable signal are active. The first synchronization and comparison circuit receives the write enable signal, the read enable signal, the write clock signal, the read clock signal, the first read address, and the first latch write address, and generates a comparison signal based on a comparison of the first latch write address with the first read address when the read enable signal is active. The second synchronization and comparison circuit receives the comparison signal, the first latch write signature, and the first read signature, and generates a fault signal based on a comparison of the first latch write signature with the first read signature.

In another embodiment of the present invention, an integrated circuit (IC) for detecting errors in data packets is provided. The integrated circuit includes a memory array and an error detection system. The memory array receives a first write address, a first read address, a write clock signal, a write enable signal, a read clock signal, and a read enable signal. The memory array stores data packets. The error detection system is connected to the memory array to detect one or more errors in the data packets. The error detection system includes a write signature generation circuit, a read signature generation circuit, a trigger generation circuit, first and second latching circuits, and first and second synchronization and comparison circuits. The read signature generation circuit receives the first read address, the read clock signal, the read enable signal, and a first data packet. The read signature generation circuit generates first read signature based on at least one of the first data packet and read signature of a second data packet. Further, the read signature generation circuit stores the first read signature. The write signature generation circuit receives the first write address, the write clock signal, the write enable signal, and a third data packet. The write signature generation circuit generates first write signature based on at least one of the third data packet and write signature of a fourth data packet. Further, the write signature generation circuit stores the first write signature. The first latching circuit receives the first write address, the write enable signal, and the write clock signal. The first latching circuit also receives a first trigger signal from the trigger generation circuit and stores the first write address as a first latch write address when the first trigger signal and the write enable signal are active. The second latching circuit receives the write enable signal, the write clock signal, the first trigger signal, and the first write signature and stores the first write signature as first latch write signature when the first trigger signal and the write enable signal are active. The first synchronization and comparison circuit receives the write enable signal, the read enable signal, the write clock signal, the read clock signal, the first read address and the first latch write address and generates a comparison signal based on a comparison of the first latch write address with the first read address when the read enable signal is active. The second synchronization and comparison circuit receives the comparison signal, the first latch write signature and the first read signature, and generates a fault signal based on a comparison of the first latch write signature with the first read signature.

In yet another embodiment of present invention, a method for detecting errors in data packets stored in a memory is provided. The method comprises receiving a write address, a read address, a write enable signal, a read enable signal, first and second data packets, a read clock signal, and a write clock signal. The method further comprises generating read signature based on at least one of the first data packet and read signature of a third data packet. The method further comprises generating write signature based on at least one of the second data packet and a write signature of a fourth data packet. The method further comprises generating a trigger signal. The method further comprises storing the write address as a latch write address when the trigger signal and the write enable signal are active. The method further comprises storing the write signature as latch write signature when the trigger signal and the write enable signal are active. The method further comprises generating a comparison signal based on a comparison of the latch write address with the read address when the read enable signal is active. The method further comprises generating a fault signal based on the comparison signal and a comparison of the read signature with the latch write signature.

Various embodiments of the present invention provide an error detection system for detecting errors in data packets stored in a memory. The error detection system includes a trigger generation circuit, write and read signature generation circuits, first and second latching circuits, and first and second synchronization and comparison circuits. The error detection system receives first and second data packets. The read signature generation circuit generates and stores read signature based on at least one of a first data packet and read signature of a second data packet. The write signature generation circuit generates and stores write signature based on at least one of a third data packet and write signature of a fourth data packet. The trigger generation circuit generates and provides a trigger signal to the first and second latching circuits. The first latching circuit stores the write address as a latch write address. The second latching circuit stores the write signature as latch write signature when the trigger signal is active. The first synchronization and comparison circuit compares the latch write address with the read address and generates a comparison signal. When the second synchronization and comparison circuit receives an activated comparison signal, the second synchronization and comparison circuit compares the latch write signature with the read signature and generates a fault signal. Thus, the error detection system detects errors in the first through fourth data packets based on a logic state of the fault signal. The error detection system updates the write and read signature for a set of data packets till the trigger generation circuit generates a subsequent trigger signal. Thus, the error detection system detects the error in the set of data packets. Further, a timer-based trigger generation circuit generates the trigger signal at predefined time intervals. Thus, the first and second latching circuits store the write address and the write signature, respectively, at predefined time intervals. As a result, the error detection system detects errors in the set of data packets at predefined time intervals. Moreover, the error detection system detects errors in the set of data packets when the memory is empty as well.

Referring now to FIG. 1, a schematic block diagram of an integrated circuit (IC) 100 to detect errors in data packets in accordance with an embodiment of the present invention is shown. The IC 100 includes a memory 102 and an error detection system 104. The memory 102 includes a memory array 106, and an address comparison circuit 108. The error detection system 104 includes a write signature generation circuit 110, a read signature generation circuit 112, a trigger generation circuit 114, first through fourth latching circuits 116-122, and first and second synchronization and comparison circuits 124 and 126.

The memory array 106 receives a write enable signal (WEN), a read enable signal (REN), a write clock signal (WCLK), a read clock signal (RCLK), a write address (WADDR), and a read address (RADDR). When the write enable signal (WEN) is activated, a processor (not shown) performs a write operation and stores a data packet in the memory array 106. Similarly, when the read enable signal (REN) is activated, the processor performs a read operation and fetches a data packet from the memory array 106. The address comparison circuit 108 compares the write address (WADDR) with the read address (RADDR) and generates a memory empty signal.

During the write operation, the write signature generation circuit 110 receives a data packet to be written in the memory array 106 and generates a write signature (WSD). During the read operation, the read signature generation circuit 112 receives the read data packet and generates a read signature (RSD).

In one embodiment, the trigger generation circuit 114 is a timer circuit that generates a trigger signal at predetermined time intervals. In another embodiment, the trigger generation circuit 114 is a radiation detection circuit that includes a sensor for measuring a radiation level in the IC 100. The radiation detection circuit stores a radiation threshold value that indicates an allowable radiation level in the IC 100. When the radiation level of the IC 100 exceeds the radiation threshold value, the radiation detection circuit generates the trigger signal. In yet another embodiment, the trigger generation circuit 114 is a write counter. The write counter counts and stores a write count that corresponds to the number of times the write operation is performed on the memory array 106. When the write count exceeds a threshold write count, the write counter generates the trigger signal. Thus, the trigger signal is activated when write counter exceeds a predetermined value so that the error detection system 104 detects errors in the data packets. The write counter resets automatically to generate the trigger signal repeatedly.

In yet another embodiment, at least one of the timer circuit, the radiation circuit, and the write counter may be implemented in a controller. The safety standards of the IC 100 are determined based on at least one of the radiation threshold value and the threshold write count. The safety standards may also be determined based on the predetermined time intervals. If the error detection system 104 fails to detect a significant number of errors in the data packets, the IC 100 may malfunction. This requires the IC 100 to be reset to correct the errors as a recovery method. Thus, the predetermined time interval should be selected such that no error goes undetected.

The first latching circuit 116 is connected to the trigger generation circuit 114 to receive the trigger signal, and receives a write address (WADDR). If the trigger signal is active, then the first latching circuit 116 stores the write address (WADDR) as a first latch write address (LWADDR1).

The second latching circuit 118 is connected to the trigger generation circuit 114 and the write signature generation circuit 110 to receive the trigger signal and the write signature (WSD), respectively. If the trigger signal is active, then the second latching circuit 118 stores the write signature (WSD) as a first latch write signature (LWSD1).

The third latching circuit 120 is connected to the trigger generation circuit 114 to receive the trigger signal and receives a subsequent write address (WADDR). When the trigger signal is active, the third latching circuit 120 stores the subsequent write address (WADDR) as a second latch write address (LWADDR2).

The fourth latching circuit 122 is connected to the trigger generation circuit 114 and the write signature generation circuit 110 to receive the trigger signal and subsequent write signature (WSD), respectively. When the trigger signal is active, the fourth latching circuit 122 stores the subsequent write signature (WSD) as a second latch write signature (LWSD2).

The first synchronization and comparison circuit 124 is connected to the first and third latching circuits 116 and 120 to receive the first and second latch write addresses (LWADDR1 and LWADDR2), respectively. The first synchronization and comparison circuit 124 compares the first latch write address (LWADDR1) with the read address (RADDR) and also compares the second latch write address (LWADDR2) with the read address (RADDR), and then generates a comparison signal (CS) based on the two comparisons. The first synchronization and comparison circuit 124 synchronizes the first and second latch write addresses (LWADDR1 and LWADDR2) with the read address (RADDR).

The second synchronization and comparison circuit 126 is connected to the read signature generation circuit 112 to receive the read signature (RSD), the second and fourth latching circuits 118 and 122 to receive the first and second latch write signatures (LWSD1 and LWSD2), respectively, and the write signature generation circuit 110 to receive the write signature (WSD). When the second synchronization and comparison circuit 126 receives the comparison signal (CS), the circuit 126 compares the first latch write signature (LWSD1) with the read signature (RSD), and compares the second latch write signature (LWSD2) with the read signature (RSD) to generate a fault signal. The fault signal indicates if there is an error in the data packets. Further, the second synchronization and comparison circuit 126 synchronizes the first and second latch write signatures (LWSD1 and LWSD2) with the read signature (RSD).

In operation, the memory array 106 receives a first data packet and a first address during a first write operation. When the memory array 106 receives an activated write enable signal (WEN), the memory array 106 stores the first data packet at a memory location specified by the first address. When the write signature generation circuit 110 receives the first data packet and the write enable signal (WEN) is active, then the write signature generation circuit 110 generates a first write signature based on the first data packet. The write signature generation circuit 110 stores the first write signature.

During a second write operation, the memory array 106 receives a second data packet and a second write address. When the write enable signal (WEN) is active, the memory array 106 stores the second data packet at the second write address. When the write signature generation circuit 110 receives the second data packet and the write enable signal (WEN) is active, the write signature generation circuit 110 generates a second write signature based on the second data packet and the first write signature. The write signature generation circuit 110 stores the second write signature.

In one embodiment, the second write address is consecutive to the first write address. In another embodiment, the second address is an offset address calculated using the first address.

The trigger generation circuit 114 generates a first trigger signal. When the first latching circuit 116 receives an activated first trigger signal and the activated write enable signal (WEN), the first latching circuit 116 stores the second address as a first latch write address (LWADDR1). When the second latching circuit 118 receives the activated first trigger signal and the activated write enable signal (WEN), the second latching circuit 118 stores the second write signature as first latch write signature (LWSD1).

During a first read operation, the memory array 106 receives the first address and the read enable signal (REN). If the read enable signal (REN) is activate, then the read signature generation circuit 112 receives the first data packet and generates a first read signature based on the first data packet. The read signature generation circuit 112 stores the first read signature. When the first synchronization and comparison circuit 124 receives the activated read enable signal (REN), the circuit 124 compares the first latch write address (LWADDR1) with the first address. Since the first latch write address (LWADDR1) corresponds to the second address, the first latch write address (LWADDR1) is not equal to the first address, and hence, the first synchronization and comparison circuit 124 does not generate a comparison signal (CS), that is, the comparison signal CS is not active.

During a second read operation, the memory array 106 receives the second address and the read enable signal and if the read enable signal (REN) is active, the circuit 112 reads the second data packet and generates a second read signature based on the second data packet and the first read signature. The read signature generation circuit 112 stores the second read signature.

When the first synchronization and comparison circuit 124 receives the activated read enable signal (REN), the circuit 124 compares the first latch write address (LWADDR1) with the second address. Since the first latch write address (LWADDR1) corresponds to the second address, the first latch write address (LWADDR1) is equal to the second address. Thus, the first synchronization and comparison circuit 124 generates a first comparison signal (CS). When the second synchronization and comparison circuit 126 receives the active first comparison signal (CS) and the activate read enable signal (REN), the circuit 126 compares the first latch write signature (LWSD1) with the second read signature. Since the first latch write signature (LWSD1) corresponds to the first read signature and the second data packet, the first latch write signature (LWSD1) should be equal to the second read signature. The second synchronization and comparison circuit 126 generates a first fault signal, which indicates whether or not there is an error in the first and second data packets.

During a third write operation, the memory array 106 receives a third data packet and a third address. When the write enable signal (WEN) is active, the memory array 106 stores the third data packet at the memory location specified by the third address. When the write signature generation circuit 110 receives the third data packet and the write enable signal (WEN) is active, the circuit 110 generates a third write signature based on the third data packet and the second write signature.

In one embodiment, the trigger generation circuit 114 generates a second trigger signal when the first comparison signal generated by the first synchronization and comparison circuit 124 is activate. In another embodiment, the trigger generation circuit 114 generates the second trigger signal when the first synchronization and comparison circuit 124 deactivates the first comparison signal.

The first latching circuit 116 receives an activated second trigger signal and the activated write enable signal (WEN), and stores the third address as the second latch write address (LWADDR2) (the first latch write address (LWADDR1) is updated to the second latch write address (LWADDR2)). The second latching circuit 118 receives the activated second trigger signal and the activated write enable signal (WEN), and stores the third write signature as second latch write signature (LWSD2) (the first latch write signature (LWSD1) is updated to the second latch write signature (LWSD2)).

In another embodiment, the first latching circuit 116 and the second latching circuit 118 continue to store the first latch write address (LWADDR1) and the first latch write signature (LWSD1), respectively, when the trigger generation circuit 114 generates the second trigger signal and the first synchronization and comparison circuit 124 deactivates the first comparison signal. The second trigger signal is ignored and not serviced.

In yet another embodiment, when the trigger generation circuit 114 generates the second trigger signal and the first synchronization and comparison circuit 124 deactivates the first comparison signal, the third latching circuit 120 receives the activated second trigger signal and the activated write enable signal (WEN), and stores the third address as the second latch write address (LWADDR2). The first latching circuit 116 continues to store the first latch write address (LWADDR1). The fourth latching circuit 122 receives the activated second trigger signal and the activated write enable signal (WEN), and stores the third write signature as the second latch write signature (LWSD2). The second latching circuit 118 continues to store the first latch write signature (LWSD1).

In another embodiment, the third and fourth latching circuits 120 and 122 are connected to the first and second latching circuits 116 and 118, respectively. The third latching circuit 120 provides the second latch write address (LWADDR2) to the first latching circuit 116 and the fourth latching circuit 122 provides the second latch write signature (LWSD2) to the second latching circuit 118 when the first comparison signal is active.

During a third read operation, the memory array 106 also receives the third address. The read signature generation circuit 112 generates third read signature based on the third data packet and the second write signature.

When the first synchronization and comparison circuit 124 receives the activated read enable signal (REN), it compares the second latch write address (LWADDR2) with the third address. Since the second latch write address (LWADDR2) corresponds to the third address, the first synchronization and comparison circuit 124 generates a second comparison signal. When the second synchronization and comparison circuit 126 receives the second comparison signal, it compares the second latch write signature (LWSD2) with the third read signature and generates a second fault signal, thereby detecting an error in the third data packet based on a logic state of the second fault signal. Thus, the error detection system 104 detects errors in a set of data packets including the first and second data packets and not only individual data packets.

In an embodiment, the first and third latching circuits 116 and 120 store first and second valid bits along with the first and second latch write addresses (LWADDR1 and LWADDR2), respectively. When the first latching circuit 116 receives the activated first trigger signal, the first latching circuit 116 stores the first latch write address (LWADDR1) and the first valid bit at a logic high state. The logic high first valid bit indicates that the first latch write address (LWADDR1) and the first latch write signature (LWSD1) are valid. Similarly, a logic high second valid bit indicates that the second latch write address (LWADDR2) and the second latch write signature (LWSD2) are valid. When the first synchronization and comparison circuit 124 receives the activated read enable signal (REN), it checks the logic state of the first valid bit. When the first valid bit is at the logic high state, the first synchronization and comparison circuit 124 generates the first comparison signal.

In another embodiment, the first synchronization and comparison circuit 124 includes multiple delay circuits (not shown). When the trigger generation circuit 114 generates the first trigger signal and subsequently the second trigger signal, a delay circuit delays the second trigger signal till the first synchronization and comparison circuit 124 generates the first comparison signal, thereby pipelining the trigger signals generated by the trigger generation circuit 114.

Each of the first through fourth latching circuits 116-122 is at least one of a latch and a flip-flop. Signature generation is known and understood by those of skill in the art. For example, in one embodiment, the write and read signature generation circuits 110 and 112 generate the write and read signatures (WSD and RSD), respectively, using algorithms such as, but not limited to, cyclic redundancy check, modulo-checksum and column parity. It also will be understood by those with skill in the art that there can be multiple latching circuits to store latch write addresses and the latch write signature.

The second synchronization and comparison circuit 126 is connected to the write signature generation circuit 110 to receive the first write signature. When the address comparison circuit 108 generates the memory empty signal, the second synchronization and comparison circuit 126 receives the memory empty signal, compares the first write signature with the read signature (RSD), and generates the first fault signal. Thus, the error detection system 104 also detects errors in the data packets when the trigger generation circuit 114 does not generate the trigger signal.

Figure 2A:
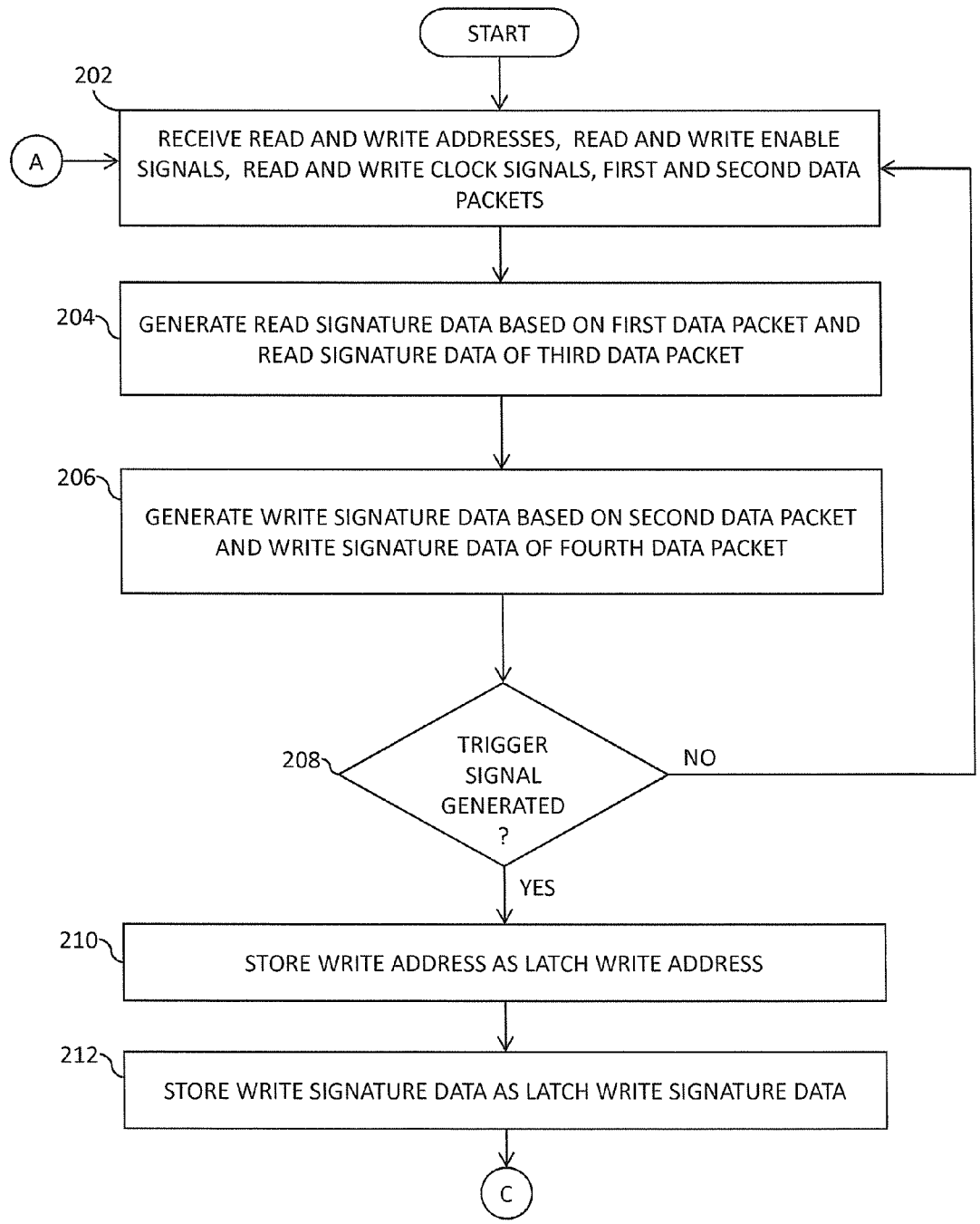
FIGS. 2A and 2B are a flow chart illustrating a method performed by the error detection system of FIG. 1 to detect errors in the data packets stored in the memory of FIG. 1 in accordance with an embodiment of the present invention.
Figure 2B:
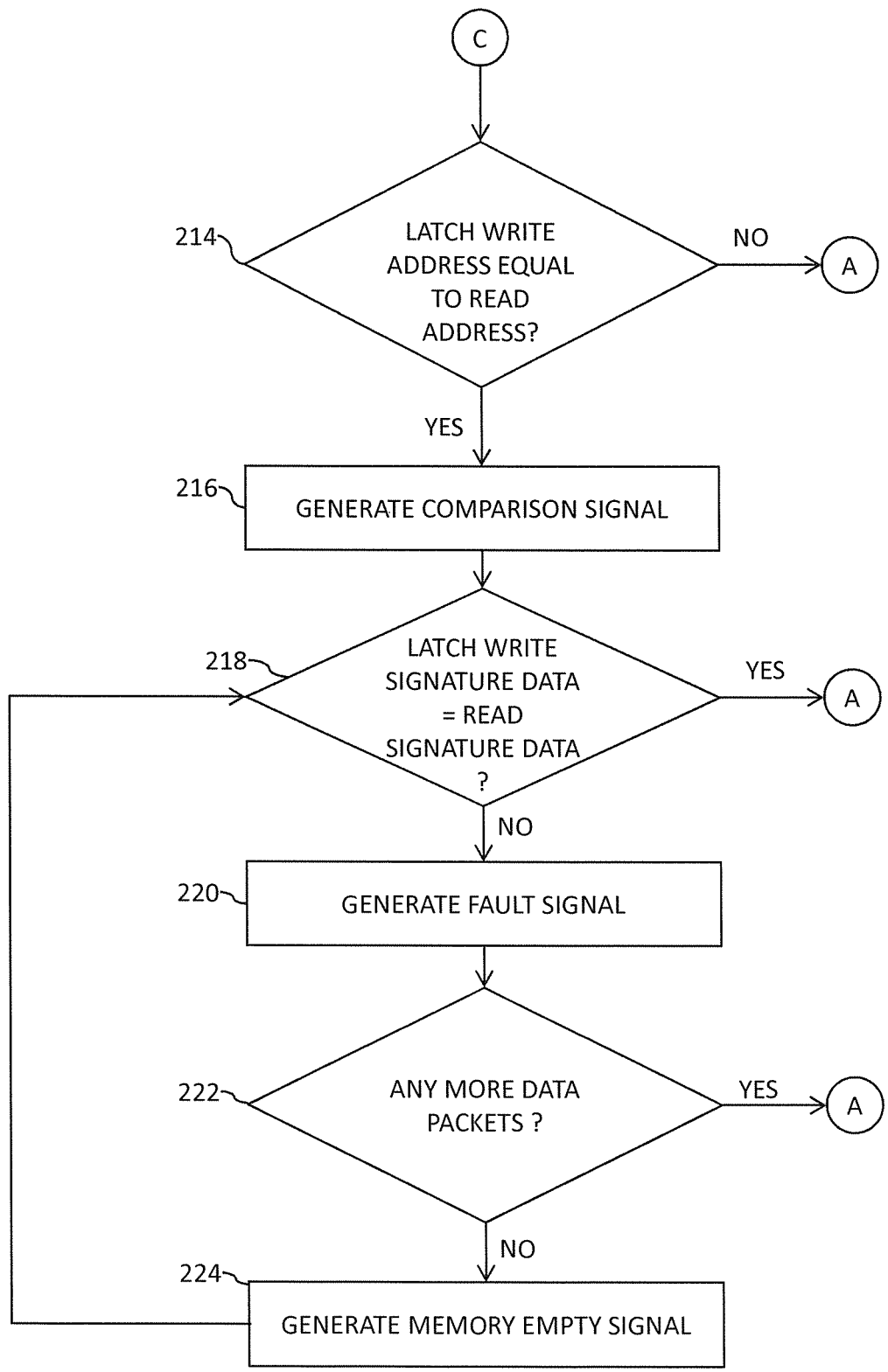

Referring now to FIGS. 2A and 2B, a flow chart illustrating a method for detecting errors in data packets in accordance with an embodiment of the present invention is shown. At step 202, the error detection system 104 receives a read address (RADDR), a write address (WADDR), a read enable signal (REN), a write enable signal (WEN), a read clock signal (RCLK), a write clock signal (WCLK), and first and second data packets. At step 204, the read signature generation circuit 112 generates a read signature (RSD) based on at least one of the first data packet and a read signature (RSD) of a third data packet. In a first instance, the read signature generation circuit 112 generates the RSD based on the data packet. Subsequently, the RSD is generated based on both the data packet and a previously generated RSD, as previously described with reference to FIG. 1. At step 206, the write signature generation circuit 110 generates a write signature (WSD) based on at least one of the second data packet and a write signature (WSD) of a fourth data packet. In a first instance, the write signature generation circuit 110 generates the WSD based on the data packet. Subsequently, the WSD is generated using both the data packet and a previously generated WSD, as explained with reference to FIG. 1. At step 208, the error detection system 104 checks for an active trigger signal. If, at step 208, the trigger signal is not active, then the error detection system 104 performs step 202. At step 210, the first latching circuit 116 stores the write address (WADDR) as a latch write address (LWADDR). At step 212, the second latching circuit 118 stores the write signature (WSD) as a latch write signature (LWSD).

At step 214, the first synchronization and comparison circuit 124 compares the read address (RADDR) with the latch write address (LWADDR). If, at step 214, the first synchronization and comparison circuit 124 determines that the read address (RADDR) is not equal to the latch write address (LWADDR), the error detection system 104 performs step 202.

At step 216, the first synchronization and comparison circuit 124 generates a comparison signal (CS) based on a comparison of the read address (RADDR) with the latch write address (LWADDR). At step 218, the second synchronization and comparison circuit 126 compares the read signature (RSD) with the latch write signature (LWSD). If, at step 218, the second synchronization and comparison circuit 126 determines that the read signature (RSD) is equal to the latch write signature (LWSD), the error detection system 104 performs step 202. At step 220, the second synchronization and comparison circuit 126 generates a fault signal based on the comparison of the read signature (RSD) with the latch write signature (LWSD). The fault signal indicates a presence or absence of errors in the data packets.

At step 222, the error detection system 104 determines whether there are any more data packets stored in the memory array 106 and, if so, then the error detection system 104 performs step 202. Otherwise at step 224, the second synchronization and comparison circuit 126 generates a memory empty signal and goes to step 218.

While various embodiments of the present invention have been illustrated and described, it will be clear that the present invention is not limited to these embodiments only. Numerous modifications, changes, variations, substitutions, and equivalents will be apparent to those with skill in the art, without departing from the spirit and scope of the present invention, as described in the claims.

The invention claimed is:

1. An error detection system connected to a memory in which data packets are stored, wherein the error detection system detects errors in the stored data packets, the error detection system comprising:

a read signature generation circuit that (i) receives a first read address, a read clock signal, and a read enable signal, (ii) is connected to the memory for receiving a first data packet, (iii) generates a first read signature based on at least one of the first data packet and a read signature of a second data packet, and (iv) stores the first read signature;

a write signature generation circuit that (i) receives a first write address, a write clock signal, and a write enable signal, (ii) is connected to the memory for receiving a third data packet, (iii) generates a first write signature based on at least one of the third data packet and a write signature of a fourth data packet, and (iv) stores the first write signature;

a trigger generation circuit that generates a first trigger signal;

a first latching circuit that (i) receives the first write address, the write enable signal, and the write clock signal, (ii) is connected to the trigger generation circuit for receiving the first trigger signal, and (iii) stores the first write address as a first latch write address when the first trigger signal and the write enable signal are active;

a second latching circuit that (i) receives the write enable signal and the write clock signal, (ii) is connected to the trigger generation circuit and the write signature generation circuit for receiving the first trigger signal and the first write signature, respectively, and (iii) stores the first write signature as a first latch write signature when the first trigger signal and the write enable signal are active;

a first synchronization and comparison circuit that (i) receives the read and write enable signals, and the first read address, (ii) is connected to the first latching circuit for receiving the first latch write address, and (iii) generates a comparison signal based on a comparison of the first latch write address with the first read address when the read enable signal is active; and a second synchronization and comparison circuit that (i) is connected to the first synchronization and comparison circuit, the second latching circuit, and the read signature generation circuit for receiving the comparison signal, the first latch write signature, and the first read signature, respectively, and (ii) generates a fault signal based on a comparison of the first latch write signature with the first read signature, wherein the fault signal indicates a presence of the errors in the stored data packets.

2. The error detection system of claim 1, wherein the comparison signal is inactive when the first latch write address is not equal to the first read address, and the read enable signal is active.

3. The error detection system of claim 2, wherein:
the trigger generation circuit further generates a second trigger signal,
the first and second latching circuits receive the second trigger signal, and
the first and second latching circuits store a second latch write address and second latch write signature, respectively, when the second trigger signal and the write enable signal are active.

4. The error detection system of claim 2, wherein the write signature generation circuit receives a second write address and a fifth data packet, and generates a second write signature based on at least one of the fifth data packet and the first write signature.

5. The error detection system of claim 4, further comprising:
a third latching circuit that (i) receives the second write address, the write enable signal, and the write clock signal, (ii) is connected to the trigger generation circuit for receiving a second trigger signal, and (iii) stores the second write address as a second latch write address when the second trigger signal and the write enable signal are active; and
a fourth latching circuit that (i) receives the write enable signal and the write clock signal, (ii) is connected to the trigger generation circuit and the write signature generation circuit for receiving the second trigger signal and the second write signature, respectively, and (iii) stores the second write signature as second latch write signature when the second trigger signal and the write enable signal are active.

6. The error detection system of claim 5, wherein the third and fourth latching circuits are connected to the first and second latching circuits, respectively, and wherein the third latching circuit provides the second latch write address to the first latching circuit and the fourth latching circuit provides the second latch write signature to the second latching circuit when the first comparison signal is active.

7. The error detection system of claim 5, wherein the first through fourth latching circuits include at least one of a latch and a flip-flop for storing the first latch write address, the first latch write signature, the second latch write address, and the second latch write signature, respectively.

8. The error detection system of claim 5, wherein the trigger generation circuit generates the first and second trigger signals at predefined time periods.

9. The error detection system of claim 1, wherein the trigger generation circuit includes at least one of a timer circuit, a radiation detection circuit, and a controller for generating the first trigger signal.

10. The error detection system of claim 1, further comprises an address comparison circuit that receives and compares the first write address and the first read address, and generates a memory empty signal when the first write address is equal to the first read address, wherein the memory empty signal indicates that the memory is empty.

11. The error detection system of claim 10, wherein the second synchronization and comparison circuit further receives the memory empty signal and generates the fault signal based on the memory empty signal and a comparison of the first latch write signature with the first read signature.

12. The error detection system of claim 1, wherein the second synchronization and comparison circuit activates the fault signal when the first latch write signature is not equal to the first read signature.

13. The error detection system of claim 1, wherein the second synchronization and comparison circuit deactivates the fault signal when the first latch write signature is equal to the first read signature.

14. An integrated circuit, comprising:
a memory array that receives a first write address, a first read address, a write clock signal, a write enable signal, a read clock signal, and a read enable signal, and stores a plurality of data packets; and
an error detection system, connected to the memory array, that detects errors in the stored data packets, the error detection system comprising:
a read signature generation circuit that (i) receives the first read address, the read clock signal, the read enable signal, and a first data packet of the plurality of data packets, (ii) generates first read signature based on at least one of the first data packet and read signature of a second data packet of the plurality of data packets, and (iii) stores the first read signature;
a write signature generation circuit that (i) receives the first write address, the write clock signal, the write enable signal, and a third data packet of the plurality of data packets, (ii) generates first write signature based on at least one of the third data packet and write signature of a fourth data packet of the plurality of data packets, and (iii) stores the first write signature;
a trigger generation circuit that generates a plurality of trigger signals including a first trigger signal;
a first latching circuit that (i) receives the first write address, the write enable signal, and the write clock signal, (ii) is connected to the trigger generation circuit for receiving the first trigger signal, and (iii) stores the first write address as a first latch write address when the first trigger signal and the write enable signal are active;
a second latching circuit that (i) receives the write enable signal and the write clock signal, (ii) is connected to the trigger generation circuit for receiving the first trigger signal, (iii) is connected to the write signature generation circuit for receiving the first write signature, and (iv) stores the first write signature as first latch write signature when the first trigger signal and the write enable signal are active;
a first synchronization and comparison circuit that (i) receives the write enable signal, the read enable signal, the write clock signal, the read clock signal and the first read address, (ii) is connected to the first latching circuit for receiving the first latch write address, and (iii) generates a comparison signal based on a comparison of the first latch write address with the first read address when the read enable signal is active; and
a second synchronization and comparison circuit that (i) is connected to the first synchronization and comparison circuit for receiving the comparison signal, (ii) is connected to the second latching circuit for receiving the first latch write signature, (iii) is connected to the read signature generation circuit for receiving the first read signature, and (iv) generates a fault signal based on a comparison of the first latch write signature with the first read signature.

15. The integrated circuit of claim 14, wherein the comparison signal is inactive when the first latch write address is not equal to the first read address, and the read enable signal is active.

16. The integrated circuit of claim 15, wherein:
the trigger generation circuit further generates a second trigger signal,
the first and second latching circuits receive the second trigger signal, and
the first and second latching circuits store a second latch write address and second latch write signature, respectively, when the write enable signal is active.

17. The integrated circuit of claim 15, wherein:
the trigger generation circuit further generates a second trigger signal, and
the write signature generation circuit receives a second write address and a fifth data packet, and generates a second write signature based on at least one of the fifth data packet and the first write signature.

18. The integrated circuit of claim 17, further comprising:
a third latching circuit that (i) receives the second write address, the write enable signal, and the write clock signal, (ii) is connected to the trigger generation circuit for receiving the second trigger signal, and (iii) stores the second write address as a second latch write address when the write enable signal is active; and
a fourth latching circuit that (i) receives the write enable signal and the write clock signal, (ii) is connected to the trigger generation circuit for receiving the second trigger signal, (iii) is connected to the write signature generation circuit for receiving the second write signature, and (iv) stores the second write signature as a second latch write signature when the write enable signal is active.

19. The integrated circuit of claim 18, wherein the third and fourth latching circuits are connected to the first and second latching circuits, respectively, and the third latching circuit provides the second latch write address to the first latching circuit and the fourth latching circuit provides the second latch write signature to the second latching circuit when the first comparison signal is active.

20. A method for detecting errors in data packets stored in a memory of an integrated circuit, the method comprising:
receiving a write address, a read address, a write enable signal, a read enable signal, and first and second data packets;
generating a first read signature based on at least one of the first data packet and a read signature of a third data packet;
generating a first write signature based on at least one of the second data packet and a write signature of a fourth data packet;
generating a trigger signal;
storing the write address as a latch write address when the trigger signal and the write enable signal are active;
storing the first write signature as a latch write signature when the trigger signal and the write enable signal are active;
generating a comparison signal based on a comparison of the latch write address with the read address when the read enable signal is active; and
generating a fault signal based on a comparison of the first read signature with the latch write signature and the comparison signal.

* * * * *